(12) United States Patent
Yamada et al.

(10) Patent No.: US 6,570,678 B1
(45) Date of Patent: *May 27, 2003

(54) IMAGE REPRODUCING METHOD

(75) Inventors: Tomoko Yamada, Kanagawa-ken (JP); Shinji Itoh, Kanagawa-ken (JP)

(73) Assignee: Fuji Photo Film Co., Ltd., Kanagawa-ken (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/770,048

(22) Filed: Dec. 19, 1996

(30) Foreign Application Priority Data

Dec. 22, 1995 (JP) ............................................. 7-335000

(51) Int. Cl.⁷ ............................ H04N 1/378; H04N 1/04
(52) U.S. Cl. ........................ 358/450; 358/474; 358/486; 358/527
(58) Field of Search ................................ 358/540, 537, 358/449, 527, 450, 528, 452, 442; 395/109, 102, 117

(56) References Cited

U.S. PATENT DOCUMENTS

| | | | | |
|---|---|---|---|---|
| 4,769,694 A | * | 9/1988 | Oshikoshi ..................... | 358/540 |
| 4,825,296 A | * | 4/1989 | Wagensonner et al. ..... | 358/527 |
| 5,027,196 A | * | 6/1991 | Ono et al. ................... | 358/527 |
| 5,055,941 A | * | 10/1991 | Suzuki ........................ | 358/450 |
| 5,226,098 A | * | 7/1993 | Hirosawa .................... | 358/450 |
| 5,272,549 A | * | 12/1993 | McDonald ................... | 358/527 |
| 5,295,204 A | * | 3/1994 | Parulski ...................... | 358/527 |
| 5,327,265 A | * | 7/1994 | McDonald ................... | 358/527 |
| 5,652,663 A | * | 7/1997 | Zelten ......................... | 358/537 |
| 5,659,770 A | * | 8/1997 | Yamada ...................... | 358/450 |

* cited by examiner

Primary Examiner—Cheukfan Lee
(74) Attorney, Agent, or Firm—Birch, Stewart, Kolasch & Birch, LLP

(57) ABSTRACT

A color image recorded on an original is photoelectrically read out at a first picture element interval and an image signal representing the color image is obtained. An image composing processing is carried out on the image signal under signal composing conditions determined on the basis of a desired image composition and the processed composite image signal is reproduced as a visible image on a recording material. In such an image reproducing system, a color image on an original is photoelectrically read out at a second picture element interval larger than the first picture element interval and a rough image signal is obtained. Image composing processing is carried out on the rough image signal under signal composing conditions determined on the basis of a desired image composition. The processed rough image signal is reproduced as a visible image on a display and the signal composing conditions are corrected so that the visible image on the display satisfies the desired image composition. Image composing processing is carried out on an image signal obtained by photoelectrically reading out the color image on the original at the first picture element interval under the corrected signal composing conditions.

3 Claims, 2 Drawing Sheets

IMAGE REPRODUCING METHOD

BACKGROUND OF THE INVENTION

1. Field of the Invention

This invention relates to an image reproducing method for reproducing, as a visible image, image signals obtained from a color image on a reflective original such as a photograph, a print or the like or a transmission original such as a negative film, a reversal film or the like.

2. Description of the Related Art

Recently there has been developed a digital photographic printer in which image information recorded on a photographic film such as a negative film, a reversal film or the like or a print is photoelectrically read out and is converted into a digital image signal, the digital image signal is subjected to image processing and a photosensitive material such as photographic paper is scanned by a recording light beam modulated according to the processed image signal, thereby recording a visible image on the photosensitive material.

In the digital photographic printer, editing of an image such as a composition of a plurality of images into an image and division of an image, layout of a print image such as editing of characters and an image, and image processing such as adjustment of color and/or density, adjustment of scale, contour enhancement and the like can be freely carried out, and a print freely edited or processed according to its purpose can be output. Further in a conventional print by area exposure, it is impossible to reproduce the whole image density information carried by the film or the like due to limitation in the reproducible density range of a photosensitive material. However using a digital photographic printer, it is possible to reproduce the image density information carried by the film to almost 100%.

Such a digital photographic printer basically comprises a read-out means which reads out an image recorded on an original such as a photographic film, and an image recording means which carries out image processing on an image signal obtained in order to determine exposure conditions and the like which are used in recording a visible image, causes an exposure light beam to scan a photosensitive material according to the exposure conditions determined, develops the exposed photosensitive material and displays a visible image on a monitor.

In the read-out means, for instance, in the case of slit scanning, a line reading light is projected onto the film while the film is fed in a direction perpendicular to the line reading light (or the reading light and the photoelectric converter element are moved), thereby two-dimensionally scanning the film. The transmission light which is transmitted through the film and carries thereon image information is focused on the light receiving face of the photoelectric converter element such as a CCD line sensor and is converted into an electric image signal. The electric image signal carrying thereon data on the amount of light is amplified and converted to a digital image signal through an A/D conversion. Then the digital image signal is subjected to various image processings such as compensation for fluctuation in properties of the CCD element, density conversion, adjustment of scale and the like and transferred to the image recording means.

In the image recording means, the image signal is reproduced as a visible image on a display such as a CRT. The operator observes the reproduced visible image and, if necessary carries out a gradation correction, a color/density correction and the like (setting of setup conditions) on the reproduced image, and transfers the corrected image signal to a printer or a monitor as a recording image signal when the reproduced image becomes satisfactory as a finished print.

In the printer, in the case of a raster scan (light beam scanning) image recording system, three color light beams, e.g., red, green and blue light beams, corresponding to photosensitive layers for the three colors formed in the photosensitive material are modulated according to the recording image signals and the modulated light beams are deflected in a main scanning direction while the photosensitive material is fed in a direction substantially normal to the main scanning direction (sub-scanning), whereby the photosensitive material is two-dimensionally scanned by the modulated light beams and an image on the film is recorded on the photosensitive material as a visible image.

After exposure to the recording light beam, the photosensitive material is subjected to development processing according to the kind of the photosensitive material. For example, when the photosensitive material is a silver salt photosensitive material, color forming/development, bleaching/fixing, washing and drying are carried out in sequence and then finished prints are output.

Further there also has been put into practice a method in which an image on an original is read out at larger picture element intervals, thereby obtaining a rough image signal, the rough image signal is reproduced as a visible image on a CRT, image processing conditions such as tone of the final reproduced image are determined on the basis of the visible image displayed on the CRT, a fine image signal representing the image on the original is processed on the basis of the image processing conditions determined, and a final reproduced image is recorded on a photosensitive material on the basis of the processed image signal.

Recently an image signal obtained from an original is processed to insert characters into the reproduced image, to margin the reproduced image or to designate the size of the reproduced image. Conventionally such processing is directly carried out on the image signal obtained and the result of the processing cannot be known until the final reproduced image is recorded on a photosensitive material or the like. Therefore when the characters are in a wrong position in the recorded image, the margin is incorrect or the size of the recorded image is incorrect, processing of the image signal must be carried out again, which results in deterioration in working efficiency, and at the same time, the photosensitive material is wasted.

SUMMARY OF THE INVENTION

In view of the foregoing observations and description, the primary object of the present invention is to provide an image reproducing method which can reproduce a composite image without wasting a photosensitive material and deteriorating the working efficiency.

In accordance with the present invention, there is provided a method of reproducing a composite image comprising the steps of photoelectrically reading out a color image recorded on an original at a first picture element intervals, thereby obtaining an image signal representing the color image, carrying out an image composing processing on the image signal under signal composing conditions determined on the basis of a desired image composition and reproducing the processed composite image signal as a visible image on a recording material, wherein the improvement comprises the steps of obtaining a rough image signal representing the color image on the original at second picture element intervals larger than said first picture element intervals, determining signal composing conditions on the basis of a desired image composition, carrying out an image composing processing on the rough image signal under the determined signal composing conditions, reproducing the processed composite rough image signal as a visible image on a display means, correcting, if necessary, the signal composing conditions so that the visible image on the display means satisfies the desired image composition, and carrying out an image composing processing under the corrected signal composing conditions on a fine image signal representing the color image on the original at said first picture element intervals.

The rough image signal may be obtained either by photoelectrically reading out the color image on the original at the second picture element intervals or by, for instance, thinning an image signal obtained by photoelectrically reading out the color image recorded at the first picture element intervals.

In this specification, the term "desired image composition" means, for instance, the kind of letter and/or position of the letter when characters are inserted into the image to be reproduced, whether the reproduced image is to be margined or not to be margined, the size of the reproduced image, the direction in which the reproduced image is to be rotated or the like.

In accordance with the present invention, whether or not the signal composing conditions determined on the basis of the desired image composition will actually satisfy the desired image composition, that is, whether an image recorded on a photosensitive material on the basis of the image signal processed under the signal composing conditions determined on the basis of the desired image composition will actually satisfy the requirement on the reproduced composite image can be checked on the display means and the signal composing conditions are corrected if necessary before the composite image is actually recorded on the photosensitive material. Accordingly, waste of photosensitive material and labor can be avoided, whereby the working efficiency can be improved.

DESCRIPTION OF THE PREFERRED EMBODIMENT

Figure 1:
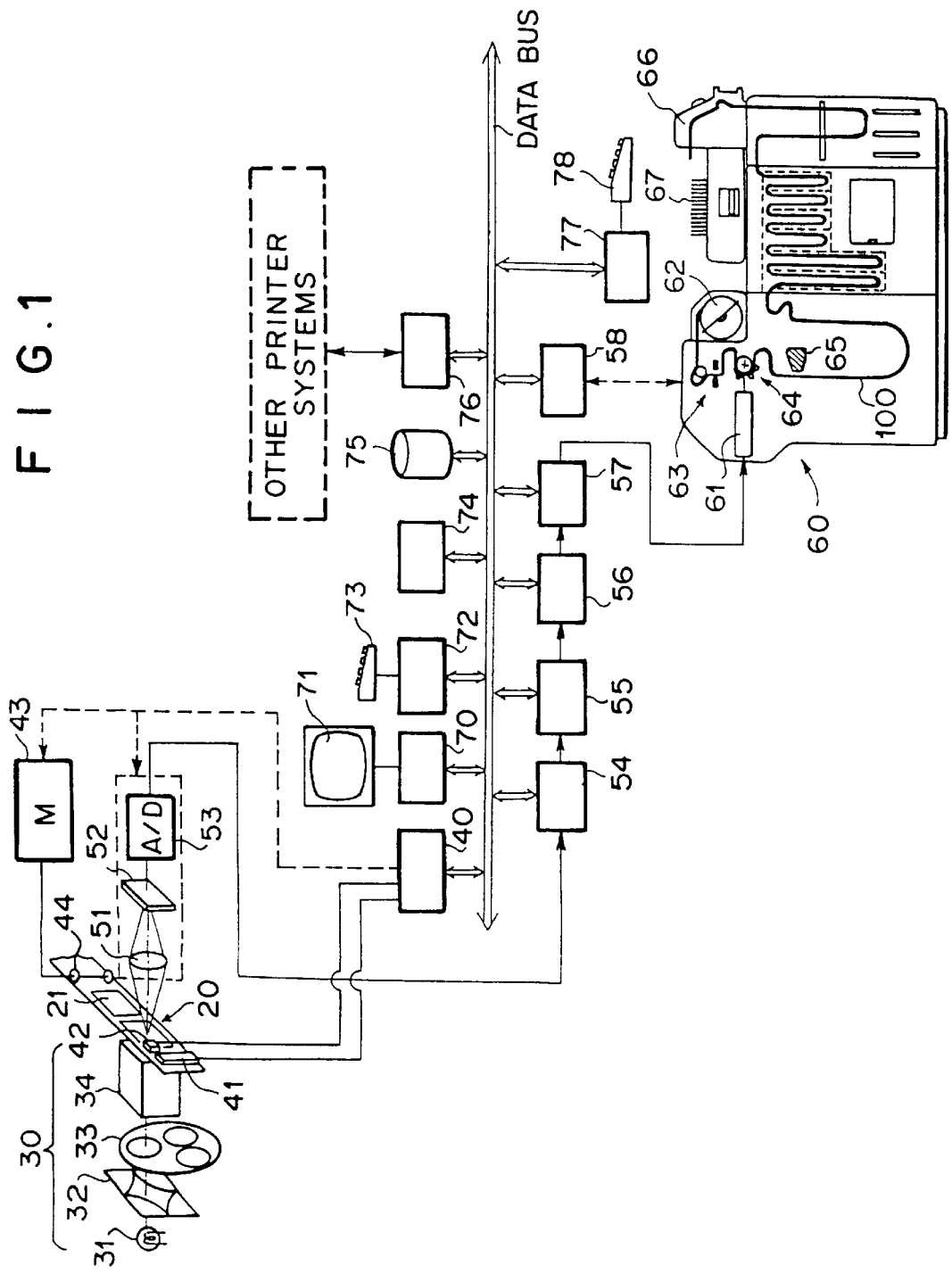
FIG. 1 is a view schematically showing a digital photographic printer to which the image reproducing method of the present invention is applied.

In FIG. 1, a digital photographic printer 100 is provided with a bar code reader 42 which reads out bar codes on a photographic film 20, a frame sensor 41 which detects frames (exposures) on the film 20 on the basis of change in density, a sprocket 44 which is in mesh with perforations of the film 20 and is rotated to feed the film 20, a motor 43 which drives the sprocket 44, and a film scanner control interface 40 which sends the film number read by the bar code reader 42 and the frame numbers and regions of the frame 21 read by the frame sensor 41 to a data bus and outputs a motor control signal to the motor 43. The photographic printer 100 is further provided with a light source unit 30 which comprises a light source 31 for projecting reading light onto the frames 21 of the film 20, a light control unit 32, a color separation unit 33 and a diffusion box 34, a CCD 52 which photoelectrically reads an image (transmission image) recorded on the frame 21, onto which the reading light is projected, through an image forming optical system 51, an AF motor 50 for controlling the focal length of the image forming optical system 51, an A/D convertor 53 which converts an image signal representing the image on the frame 21 output from the CCD 52 to a digital image signal S, a first image processing system 54 which carries out necessary corrections for compensating for influence of shading, a dark current or the like on the digital image signal S output from the A/D convertor 53 and outputs a high quality image signal to a frame memory 55, a second image processing system 56 which carries out a predetermined image processing to be described later on the processed digital image signal S stored in the frame memory 55, and a modulator driver 57 which outputs a modulation signal on the basis of the digital image signal S processed by the second image processing system 56. The photographic printer 100 is further provided with a printer 60 which reproduces a visible image based on the modulation signal output from the modulator driver 57, a printer interface 58, a hard disk 75 which stores the digital image signal S stored in the frame memory 55 by way of the data bus, a CRT monitor 71 which reproduces, as needed, a visible image based on the digital image signal S and displays image processing conditions and the like, a display interface 70, a keyboard 73 for inputting image processing conditions, correction values for the image processing conditions, an image retrieval information and the like, a keyboard interface 72, a CPU (central processing unit) 74, a communication port 76 which is connected to other digital photographic printer systems through a communication line, a keyboard 78 which is disposed in a check section for checking photographic prints reproduced by the printer 60 and is for inputting, as needed, a reprint instruction and a keyboard interface 77. The CPU 74 carries out mapping of the image retrieval information including the frame numbers read by the bar code reader 21, the image processing conditions input from the first and second image processing systems 54 and 56 and the digital image signal S input from the frame memory 55 and then stores them in the hard disk 75 by way of the data bus. Further the CPU 74 retrieves from the data bus a digital image signal S corresponding to image retrieval information input from the keyboard 73 and controls it, and controls the instruments connected to the data bus.

The hard disk 75 has a storage capacity not smaller than 25 GB. Generally an image signal required for obtaining a resolution equivalent to a photographic print of L size (about 9 cm×13 cm) is about 5 MB/frame. When the image signal is compressed to such an extent that does not deteriorate the image quality, it becomes 1 MB/frame. In an average mini-laboratory, working days may be set 25 days/month, the number of films brought in the laboratory may be set 50/day and the number of exposures per film may be set 20. Accordingly, when it is assumed that image signals are deleted in sequence when one month lapses since the film is brought in, the hard disk 75 should have a storage capacity of 25 GB.

The printer 60 comprises a printing section, a developing section and a drying section. The printing section comprises a magazine 62 which stores a roll of photographic paper 100 in a continuous length, a hole punch unit 63 which punches out reference holes in the photographic paper 100 for positioning the photographic paper 100, a sub-scanning drive system 64 which feeds the photographic paper 100 in the longitudinal direction thereof (sub-scanning) on the basis of the reference holes, an exposing light scanner 61 which modulates exposing light according to the modulation signal output from the modulator driver 57 and causing the modulated exposing light to scan the photographic paper 100 in a main scanning direction and a back printing unit 65 which records the image retrieval information input through the printer control interface 58 on the back side of the photographic paper 100.

The drying section comprises a cutter 66 which cuts the exposed photographic paper 100 exposure by exposure after drying and a sorter 67 which arranges in order the prints thus cut from the exposed photographic paper 100 in a continuous length.

Figure 2:
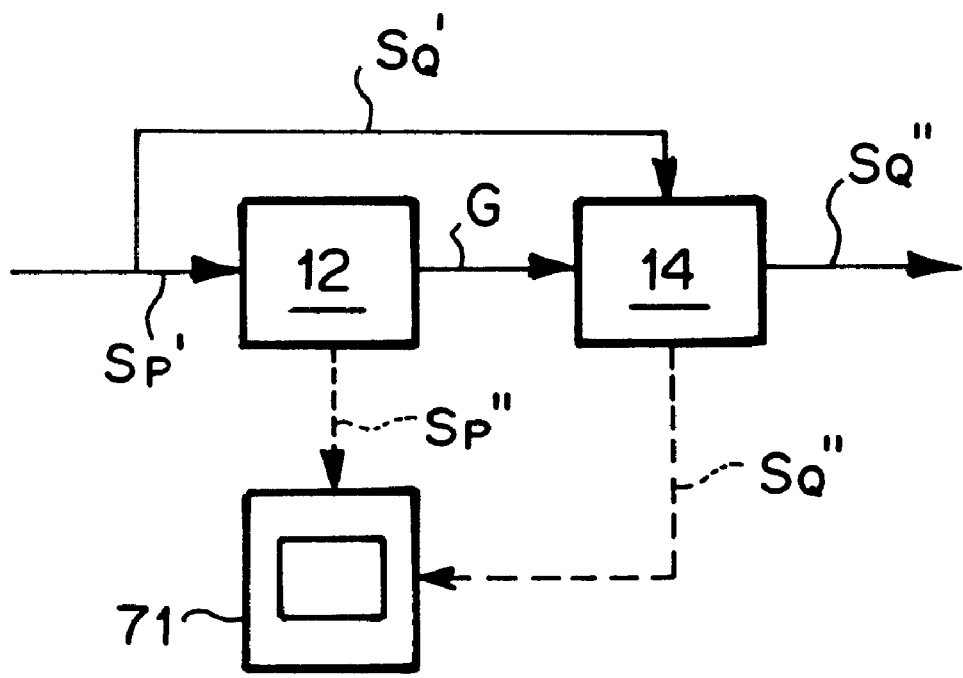
FIG. 2 is a view showing in detail the second image processing system in the digital photographic printer.

FIG. 2 shows in detail the second image processing system 56. As shown in FIG. 2, the second image processing system 56 comprises a first image processing/composing section 12 which carries out a predetermined image processing and an image composing processing on a rough digital image signal Sp' (to be described later). The first image processing/composing section 12 carries out the image composing processing under signal composing conditions which are determined on the basis of a desired image composition and input through the keyboard 73. The second image processing system 56 further comprises a second image processing/composing section 14 which carries out an image processing and an image composing processing under finally selected signal composing conditions G (to be described later) on a fine image signal $S_Q'$, thereby obtaining a final recording image signal $S_Q''$. The rough image signal Sp' processed by the first image processing/composing section 12 and the final recording image signal $S_Q''$ are reproduced on the CRT monitor 71 as a visible image. Though the first and second image processing/composing sections 12 and 14 are separately provided in this embodiment, one may double as the other.

The term "image composition" as used here means the kind of letter and/or position of the letter when characters are inserted into the image to be reproduced, whether the reproduced image is to be margined or not to be margined, the size of the reproduced image, and the like. The image processing carried out the first and second image processing/composing sections 12 and 14 include, for instance, adjustment of colors in the finally reproduced image, gradation processing and the like.

Operation of the digital photographic printer 100 will be described, hereinbelow.

In this particular embodiment, a rough reading is first carried out with relatively rough detecting intervals of the CCD 52 on an image on a film piece 20, thereby obtaining a rough image signal Sp, and then a fine reading is carried out with relatively fine detecting intervals of the CCD 52, thereby obtaining a fine image signal $S_Q$.

The motor 43 is first driven by way of the film scanner control interface 40, and the film piece 20 (negative film) carrying thereon a plurality of exposures (frames) is fed by the sprocket 44 when the left side end of the film piece 20 is brought into engagement with the sprocket 44.

While the sprocket 44 is feeding the film piece 20, the frame sensor 41 reads the density of the film piece 20 to seek for the region where an exposure (frame) 21 exists and the film scanner control interface 40 controls the motor 43 by way of the CPU 74 on the basis of the density information read by the frame sensor 41 to stop the first exposure 21 in a predetermined read-out position.

When the frame sensor 41 detects the first exposure 21 and the first exposure 21 is stopped in the predetermined read-out position, light emitted from the light source unit 30 is projected onto the exposure 21 and a transmission image of the exposure 21 enters the image forming optical system 51, whereby a predetermined image is formed on. the image receiving face of the CCD 52.

The CCD 52 reads the image formed on the image receiving face and photoelectrically converts it into an image signal representing the image on the exposure 21. At this time, the detecting interval of the CCD 52 is set relatively large, thereby obtaining a rough image signal Sp representing the image on the exposure 21. The rough image signal Sp is digitized by the A/D convertor 53, whereby a digital rough image signal Sp' is obtained. The digital rough image signal Sp' is input into the first image processing system 54 and is removed with influence of shading and/or dark current. The digital rough image signal Sp' processed by the first image processing system 54 is once stored in the frame memory 55.

The digital rough image signal Sp' once stored in the frame memory 55 is input into the first image processing/composing section 12 of the second image processing system 56. The digital rough image signal Sp' is subjected to a predetermined image processing such as a gradation processing and to an image composing processing under signal composing conditions which is determined on the basis of a desired image composition and input through the keyboard 73.

Then thus processed rough image signal Sp" is input into the CRT 71 and is reproduced as a visible image.

While observing the image displayed on the CRT 71, the operator checks whether or not the signal composing conditions determined on the basis of the desired image composition will actually satisfy the desired image composition, that is, whether the kind of letters and/or position of the letters inserted into the image to be reproduced satisfy the requirement, whether the reproduced image is and whether the margin or not to be margined satisfies the requirement, the size of the reproduced image satisfies the requirement, whether or not the object in the reproduced image is inverted or directed sideways and the like. Then the operator corrects the signal composing conditions, if necessary, and the corrected signal composing conditions or the signal composing conditions as determined previously is set as final signal composing conditions G. At the same time, the operator checks the gradation, color and the like of the image reproduced on the CRT 71 and corrects them, if necessary.

After the final signal composing conditions are thus obtained, the fine reading is carried out. As in the rough reading, light emitted from the light source unit 30 is projected onto the exposure 21 and a transmission image of the exposure 21 enters the image forming optical system 51, whereby a predetermined image is formed on the image receiving face of the CCD 52.

The CCD 52 reads the image formed on the image receiving face and photoelectrically converts it into an image signal representing the image on the exposure 21. In the fine reading, the detecting interval of the CCD 52 is set finer than in the rough reading, thereby obtaining a fine image signal $S_Q$ representing the image on the exposure 21. The fine image signal $S_Q$ is digitized by the A/D convertor 53, whereby a digital fine image signal $S_Q'$ is obtained. The digital fine image signal $S_Q'$ is input into the first image processing system 54 and is removed with influence of shading and/or dark current. The digital fine image signal $S_Q'$ processed by the first image processing system 54 is once stored in the frame memory 55.

The digital fine image signal $S_Q'$ once stored in the frame memory 55 is input into the second image processing/composing section 14 of the second image processing system 56. The digital fine image signal $S_Q'$ is subjected to an image composing processing under said final signal composing conditions, thereby obtaining a final digital fine image signal $S_Q''$. Then the final digital fine image signal $S_Q''$ is input into the printer 60 and is recorded on a photographic paper or the like as a visible image.

Otherwise the final digital fine image signal $S_Q''$ may be input into the CRT 71 and may be displayed as a visible image.

Thus in accordance with the method of the present invention, whether or not the signal composing conditions determined on the basis of the desired image composition will actually satisfy the desired image composition is checked through an image reproduced on the display means on a roughly read image signal and the signal composing conditions are corrected if necessary before the composite image is actually recorded on the photosensitive material. Accordingly, waste of photosensitive material and labor can be avoided, whereby the working efficiency can be improved.

What is claimed is:

1. A method of reproducing a composite image, comprising the steps of:

photoelectrically reading out an image recorded on an original medium at a rough picture element interval to obtain a rough image signal representing the image;

processing the rough image signal using initial signal composing conditions to produce a rough composite image signal;

displaying the rough composite image signal as a visible image;

correcting the initial signal composing conditions and the visible image so that the visible image satisfies a desired image composition, wherein the desired image composition includes type of text, position of text, margin information, composite image size information, composite image orientation information;

photoelectrically reading out the image recorded on the original medium at a fine picture element interval to obtain a fine image signal representing the image;

processing the fine image signal using the corrected signal composing conditions to produce a fine composite image signal;

reproducing the fine composite image signal as the composite image on a photosensitive material.

2. The method of claim 1, wherein said processing includes at least one of color adjustment, gradation processing, shading processing, and dark current processing.

3. The method of claim 1, wherein the original medium is one of a photograph, a negative film, and a reversal film.

* * * * *